United States Patent [19]

Szemere et al.

[11] Patent Number: 4,570,838
[45] Date of Patent: Feb. 18, 1986

[54] AMPOULE OPENER

[75] Inventors: Róbert Szemere; József Majoros; Ferenc Cséve, all of Budapest, Hungary

[73] Assignee: Magyar Optikai Müvek, Budapest, Hungary

[21] Appl. No.: 531,915

[22] Filed: Sep. 12, 1983

[30] Foreign Application Priority Data

Sep. 14, 1982 [HU] Hungary .............................. 2923/82

[51] Int. Cl.$^4$ ............................................. C03B 33/06
[52] U.S. Cl. .................................... 225/93; 30/164.9; 225/96.5; 241/99
[58] Field of Search ................... 225/93, 96.5; 241/99; 407/119; 30/164.9

[56] References Cited

U.S. PATENT DOCUMENTS

| 2,425,093 | 8/1947 | Foster | 241/99 X |
| 2,488,956 | 11/1949 | Yeskett | 241/99 X |
| 2,515,020 | 7/1950 | Scott | 30/164.9 |
| 3,152,385 | 10/1964 | Wheildon, Jr. et al. | 407/119 |
| 4,405,067 | 9/1983 | Caron | 225/93 |

FOREIGN PATENT DOCUMENTS

| 434937 | 10/1926 | Fed. Rep. of Germany . | |
| 436584 | 11/1926 | Fed. Rep. of Germany | 225/93 |
| 1111381 | 2/1956 | France . | |
| 1360700 | 3/1964 | France . | |
| 634060 | 3/1950 | United Kingdom . | |

Primary Examiner—Frank T. Yost
Attorney, Agent, or Firm—Karl F. Ross; Herbert Dubno

[57] ABSTRACT

An ampoule opener which comprises an elongated flat body having a ceramic ampoule-neck scorer affixed in the body in a longitudinal dimension thereof, e.g. along a longitudinal edge or upon a longitudinal ledge. The body is provided with a row of holes extending along the edge, the holes being of different sizes to accommodate ampoule heads of different sizes. An ampoule head, after scoring of the neck, is inserted into a selected one of the holes and is snapped off.

3 Claims, 6 Drawing Figures

AMPOULE OPENER

Field of the Invention

This invention relates to a device for opening glass ampoules in a fast and accidentfree way.

Background of the Invention

For opening glass ampoules in medical care and in other area different types of plates and files, usually made of metal are widely used. Gripping and the use of these openers are troublesome, especially with wet hands. These tools generally have a short life-span, and after a relatively short period, their cutting edge fail. Thus these tools cannot disrupt the glass surface of the ampoule neck and additional effort by hand may involve the risk of an accident.

Object of the Invention

The invention is to eliminate the deficiencies of the known solutions and to provide a device for opening glass ampoules which is simple and not expensive to manufacture and facilitates fast, convenient and accidentfree opening of ampoules.

Summary of the Invention

The invention is based on the safe gripping of the shear plate its reliable cutting properties have to be ensured, the safe gripping of the ampoule neck, weakened by the cutting edge.

According to the invention the device is provided with a shear plate embedded in a housing, and the housing is provided with holes for receiving the ampoule's headportion. The shear plate is made of ceramic, and the holes formed in the housing have the same size as the sizes of the ampoules.

A preferred embodiment of the device according to the invention has a shear plate which is embedded in the longer edge of an elongated, plate-like housing, provided with holes.

Another preferred embodiment of the device has a housing fitting well in the hand and has a contoured plate shape connected with a consolette or ledge beyond the series of holes and the shear plate is embedded in the consolette on the surface adjacent to the holes.

It is an advantage of the last mentioned embodiment that the housing is shaped with at least one hole for steady fixing.

BRIEF DESCRIPTION OF THE DRAWING

The invention will now be described by way of example with reference to the accompanying drawing, in which.

SPECIFIC DESCRIPTION

Figure 1:
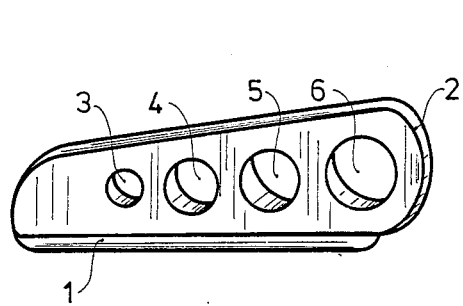
FIG. 1 is a front view of an ampoule opener according to the invention.
Figure 2:
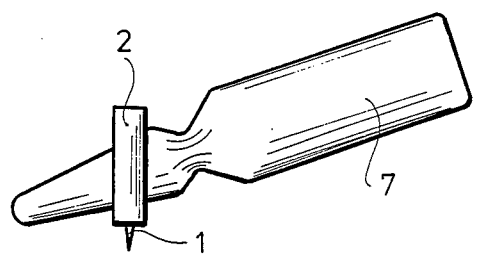
FIG. 2 is a side view of the ampoule opener with an inserted ampoule.

In FIGS. 1 and 2 the ampoule opener according to the invention is shown. The edge-formed shear plate 1 is embedded in the longer side of a long-shaped, plate-like housing 2. In the housing 2 a series of holes 3, 4, 5, 6 of different sizes is formed which can accept the head portions of the most commonly used sizes of ampoules, as can be seen from FIG. 2.

The device according to the invention is applied as follows: some scores are made on the neck of the ampoule 7 with the shear plate 1 embedded in the housing 2. Thereafter the headportion of the ampoule 7 is inserted in the hole 3, 4, 5 or 6 and it is gently stressed in the direction opposite to the breakdown. Eventually, the headportion can easily and without accident be separated. During this operation the device is kept in a position that the content of the ampoule remains intact.

Figure 3:
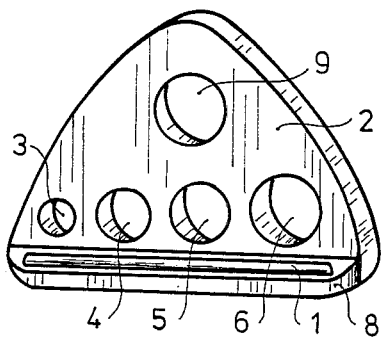
FIG. 3 is a front view of a preferred embodiment of the ampoule opener.
Figure 4:
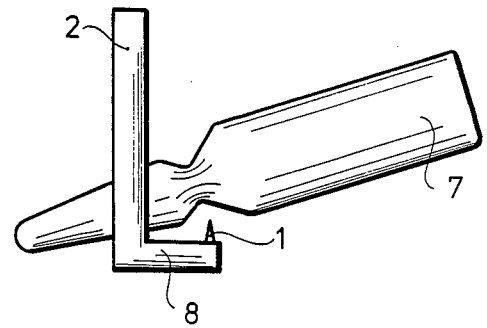
FIG. 4 is a side view of the latter ampoule opener shown in FIG. 3 with an inserted ampoule.

In FIGS. 3 and 4 another embodiment of the device according to the invention is shown. This embodiment is provided with a contoured plate-shaped housing 2 fitting well in hand and connected to a perpendicularly arranged consolette or ledge 8 beyond the series of holes 3, 4, 5, 6, and the shear plate 1 is embedded in the consolette 8 on the surface adjacent to the holes.

The head portion of ampoule 7 can be put into the proper hole 3, 4, 5 or 6 and the neckportion of the ampoule 7 can be pressed to the shear plate 1, and the ampoule can be turned around its longitudinal axis. This way the hard ceramic cutting edge of the shear plate 1 scores and disrupt the glass of the ampoule neck. The notched ampoule 7 has to be kept in the hole and then can be stressed in the direction opposite to the cutter or scorer 1 resulting the smooth separation of the headportion.

Figure 5:
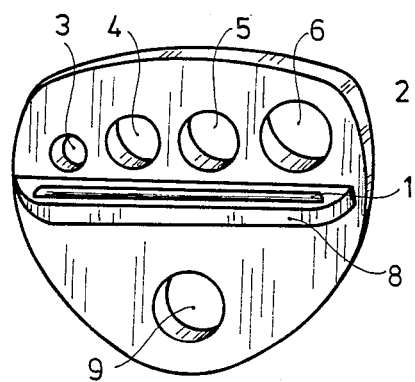
FIG. 5 is a front view of another preferred embodiment of the ampoule opener according to the invention.
Figure 6:
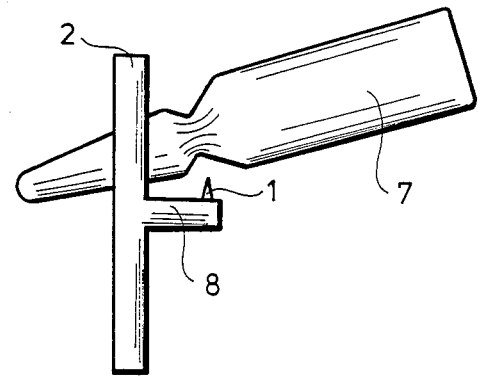
FIG. 6 is a side view of the ampoule opener shown in FIG. 5 with inserted ampoule.

The embodiment shown in FIGS. 5 and 6 is applied substantially on the same principle, wherein the consolette 8 is connected to the housing 2 at its center. The two embodiments mentioned above have at least one hole 9 in the housing 2 for steady fixing, e.g. a nurse's trolley or on a surgery table etc.

The ampoule opener according to the invention can be characterized by utmost performance and can be applied where many ampoules are used e.g. in medical care and for veterinary purposes.

The main advantage of the ampoule opener according to the invention in comparison with the known solutions is the extremely long life-span and the facility of accidentfree ampoule opening.

Furthermore it is an advantage that the technology of manufacturing is easy and simple. The housing can be formed of plastic as well.

It is another advantage of the ampoule opener that it facilitates easy disinfection and needs no maintenance.

We claim:

1. An ampoule opener which comprises:
   a flat elongate body with rounded ends and tapering from one end toward another and which can be held in a hand of a user said body being provided with a row of holes of different sizes graduated from a small diameter proximal to a small end of said body to a large diameter at a large end of said body, said holes being adapted to accommodate heads of ampoules of different sizes; and
   extending along said row and seated at a longitudinal edge of said body, an elongated ampoule scorer of ceramic material having converging flanks defining a scorer edge converging away from said body.

2. An ampoule opener which comprises:
a flat body receivable in the hand of a user and of generally triangular configuration with a base;
a row of throughgoing holes extending generally parallel to said base and of different sizes to accommodate different sized heads of respective ampoules;
a ledge projecting from said body laterally and extending generally parallel to said row whereby said row of holes lies to one side of said ledge; and
a ceramic scorer projecting from said ledge toward said one side and having an edge adapted to score a neck of an ampoule whose head is inserted into a respective one of said holes, said scorer having a sharp scoring edge defined by a pair of flanks converging away from said ledge toward said side.

3. The ampoule opener defined in claim 2, further comprising an opening formed in said body proximal to a vertex thereof opposite said base.

* * * * *